Figure 1:
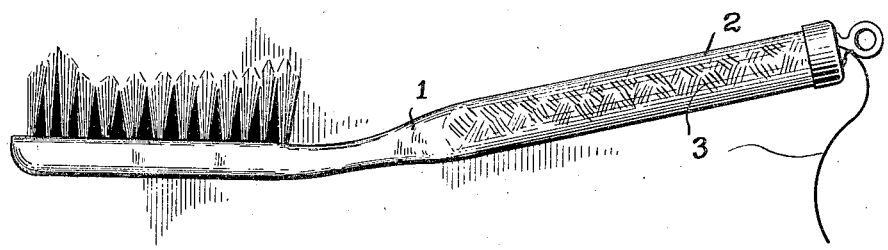

H. S. SATTERLEE.
TOILET IMPLEMENT.
APPLICATION FILED NOV. 10, 1921.

1,427,857.

Patented Sept. 5, 1922.

Henry S. Satterlee INVENTOR

Emery Varney Blair BY ATTORNEYS

Patented Sept. 5, 1922.

1,427,857

UNITED STATES PATENT OFFICE.

HENRY S. SATTERLEE, OF NEW YORK, N. Y.

TOILET IMPLEMENT.

Application filed November 10, 1921. Serial No. 514,167.

*To all whom it may concern:*

Be it known that I, HENRY S. SATTERLEE, a citizen of the United States, and a resident of the city, county, and State of New York, have invented an Improvement in Toilet Implements, of which the following is a specification.

My invention relates to a toilet implement of the general kind described in my co-pending application Serial Number 457,932, filed April 2, 1921, in which a recessed handle is provided, adapted to contain a roll of dental floss. My present invention aims to provide a suitable closure for said recess, which may be easily removable and replaceable and which is so arranged as to permit the insertion of an additional supply of dental floss when the original supply is exhausted. My improved closure is also of such a form as to be adaptable to any desired cross section of container.

Figure 2:
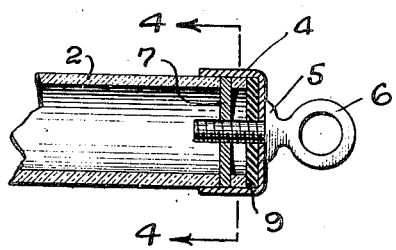
Figure 3:
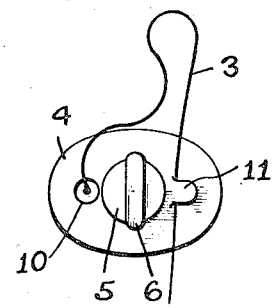

In the drawings, I have shown,

In Fig. 1, a tooth brush as an example of an implement of the kind referred to;

In Fig. 2, a longitudinal section of a portion of the handle thereof;

In Fig. 3, an end view thereof; and

Figure 4:
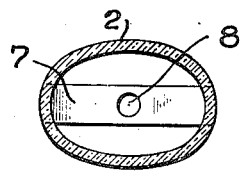

In Fig. 4, a transverse cross section taken along the lines 4—4 of Fig. 2.

Referring to the drawings, the implement 1 is provided with a hollow recessed handle 2, which in the example illustrated in the drawings is an oval shape, similar to the conventional form of tooth brush handles in use, which recess contains one or more rolls of dental floss 3. The closure comprises a cap 4 of a conformation suitable to the cross section of the handle, having an aperture through which a screw-threaded attaching member 5 passes. Member 5 may be provided with a ring 6, or may have a simple knurled head. Cap 4 may have soldered or otherwise joined to it by its extremities a suitable band of metal, formed in a loop, to serve as a tongue scraper. Passing transversely through the walls of the aperture in the handle 2 is a cross bar 7, provided with a screw-threaded aperture 8. Cross bar 7 is loosely fitted in apertures in the opposite walls of the handle 2 so that it may be entirely removed from the handle, thus leaving an unobstructed passage to the recess. The cap, cross bar and threaded attaching member are preferably made of metal, but may be made of any other suitable material if desired. A rubber washer 9, provided with an aperture registering with the aperture 10 of the cap and with a puncture or slit for passage of the floss is provided to prevent moisture entering into the recess containing the dental floss and to act as a detent when unreeling the floss. If desired, a cutting lip 11 may also be provided upon the cap. This cap is preferably made of sufficient depth to insure its covering the ends of the cross bar 7 and thus prevent its becoming dislodged.

The operation of my improved closure will be apparent from the drawings. If it is desired to renew the supply of dental floss, member 5 is unscrewed, cap 4 and washer 9 removed and the cross bar 7 pushed out of the apertures in the side walls of the handle. The additional supply of dental floss is then inserted, threaded through the washer and aperture in the cap, the cross bar re-inserted, the cap put into place and the member 5 screwed up to hold it.

While I have only shown one form of my invention, I do not intend to be confined thereto, since it will be obvious that many changes may be made without departing from the spirit thereof.

What I claim is:

1. In an article of the class described, a recessed handle, a cross bar extending transversely of said handle, and removable transversely thereof a cap adapted to fit over the end of the handle and means for securing the cap and the cross bar together.

2. In an article of the class described, a recessed handle, an apertured cross bar extending across said handle, and removable transversely thereof an apertured cap and a screw-threaded attaching member adapted to pass through the aperture of the cap and to effect a screw engagement with the aperture in the cross bar.

3. In an article of the class described, a recessed handle, a removable element engaging said handle, a cap covering the end of said handle and adapted to prevent movement of said removable element and means for connecting said cap and removable element.

4. In an article of the class described, a recessed handle, a screw-threaded apertured member extending through the walls of said recess, an apertured cap adapted to cover the end of said recess and extending downwardly thereon to prevent movement of said member and means passing through the aperture in the cap and engaging the aperture of the member.

5. In an article of the class described, a recessed handle, a cross bar extending transversely of said handle and engaging the walls thereof to prevent movement of the cross bar longitudinally of the handle, a cap adapted to fit over the end of the handle, and means for securing the cap and cross bar together.

6. In an article of the class described, a recessed handle, a cross bar extending transversely of said handle and engaging the walls thereof to prevent movement of the cross bar longitudinally of the handle, a cap adapted to fit over the end of the handle, and means passing through the cap and having screw-threaded engagement with the cross bar to secure the cap and cross bar together.

7. In an article of the class described, a recessed handle, a removable cross bar in said recess, a removable cap adapted to fit over the end of said handle, and means for securing the cap and cross bar together to retain the same in position on the handle.

In testimony whereof, I have signed my name to this specification this 4th day of November, 1921.

HENRY S. SATTERLEE.